(12) United States Patent
Goth et al.

(10) Patent No.: US 11,639,163 B2
(45) Date of Patent: May 2, 2023

(54) HYDRODYNAMIC RETARDER

(71) Applicant: VOITH PATENT GMBH, Heidenheim (DE)

(72) Inventors: Benedikt Goth, Bechhofen (DE); John Patrick Wittmann, Bubenreuth (DE); Martin Blumenstock, Frankenhardt (DE); Dieter Laukemann, Frankenhardt (DE)

(73) Assignee: Voith Patent GmbH, Heidenheim (DE)

( * ) Notice: Subject to any disclaimer, the term of this patent is extended or adjusted under 35 U.S.C. 154(b) by 134 days.

(21) Appl. No.: 17/276,238

(22) PCT Filed: Sep. 4, 2019

(86) PCT No.: PCT/EP2019/073524
§ 371 (c)(1),
(2) Date: Mar. 15, 2021

(87) PCT Pub. No.: WO2020/053039
PCT Pub. Date: Mar. 19, 2020

(65) Prior Publication Data
US 2022/0041148 A1   Feb. 10, 2022

(30) Foreign Application Priority Data
Sep. 13, 2018   (DE) ............. 10 2018 122 337.4

(51) Int. Cl.
*B60T 10/02*   (2006.01)
*B60T 1/087*   (2006.01)
*F16D 57/04*   (2006.01)

(52) U.S. Cl.
CPC ............. *B60T 10/02* (2013.01); *B60T 1/087* (2013.01); *F16D 57/04* (2013.01)

(58) Field of Classification Search
CPC .......... F16D 57/00; F16D 57/02; F16D 57/04; F16D 57/06; B60T 10/02; B60T 1/087
(Continued)

(56) References Cited

U.S. PATENT DOCUMENTS

| 3,180,692 A | 4/1965 | Mueller |
| 3,989,127 A | 11/1976 | Staudenmaier et al. |

(Continued)

FOREIGN PATENT DOCUMENTS

| DE | 1400427 C | 1/1969 |
| DE | 2408876 A1 | 9/1975 |

(Continued)

*Primary Examiner* — Thomas J Williams
(74) *Attorney, Agent, or Firm* — Laurence A. Greenberg; Werner H. Stemer; Ralph E. Locher

(57) ABSTRACT

A hydrodynamic retarder having a rotor and a stator or a rotor and an oppositely running rotor, which together form a toroidal working chamber to filled with working medium, in order to transmit a torque by means of a hydrodynamic working chamber working medium circuit. An external working medium circuit has a heat exchanger that discharges heat from the working medium. The external working medium circuit is connected by a working medium inlet and a working medium outlet to the working chamber. The working medium inlet and outlet open to the working chamber at a torus outer diameter of the working chamber. A working medium feed line opens into the external working medium circuit. A core ring filling line is connected in working-medium-conducting fashion to the working chamber. The core ring filling line opens into a core ring of the working chamber radially within the torus outer diameter.

9 Claims, 2 Drawing Sheets

Figure 1:
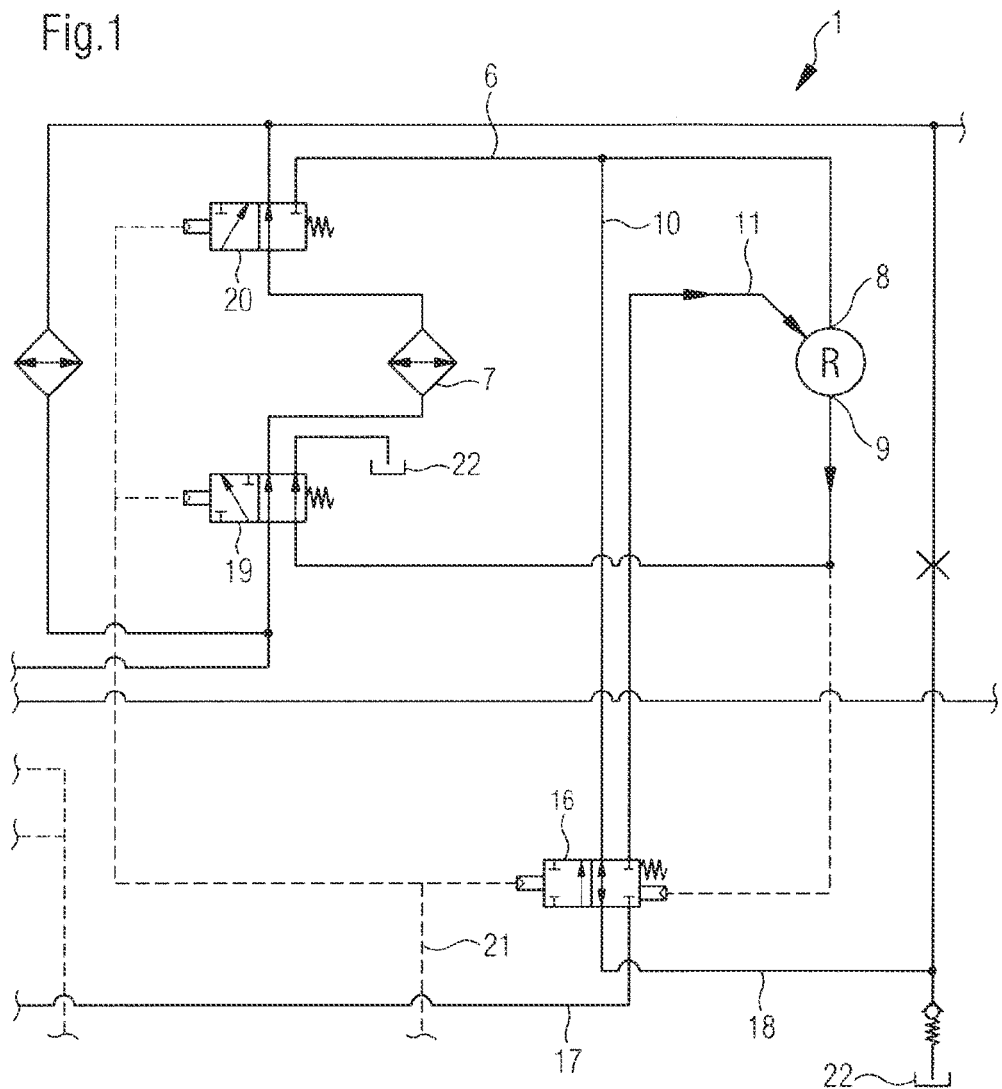

(58) Field of Classification Search
USPC .......................................... 188/290, 293, 294
See application file for complete search history.

(56) References Cited

U.S. PATENT DOCUMENTS

| | | |
|---|---|---|
| 4,175,647 A | 11/1979 | Hanke |
| 4,773,513 A | 9/1988 | Herrmann et al. |
| 6,223,718 B1 | 5/2001 | Vogelsang et al. |
| 10,570,972 B2 | 2/2020 | Schlosser et al. |
| 2005/0016804 A1 | 1/2005 | Vogelsang et al. |
| 2011/0203668 A1 | 8/2011 | Hofig et al. |
| 2016/0356328 A1 | 12/2016 | Laukemann |
| 2022/0041148 A1* | 2/2022 | Goth ...................... B60T 1/087 |

FOREIGN PATENT DOCUMENTS

| | | | |
|---|---|---|---|
| DE | 2710927 A1 | 9/1978 | |
| DE | 3545660 C1 | 6/1987 | |
| DE | 19616427 A1 | 5/1997 | |
| DE | 10150681 A1 | 5/2003 | |
| DE | 10237766 A1 | 3/2004 | |
| DE | 102006030791 A1 * | 1/2008 | .............. B60T 10/02 |
| DE | 102006030792 A1 * | 1/2008 | .............. B60T 10/02 |
| DE | 102011013548 A1 | 9/2012 | |
| DE | 102013219786 A1 | 4/2015 | |
| DE | 102014202366 A1 | 8/2015 | |
| DE | 102016213672 A1 | 2/2018 | |
| EP | 1288093 A1 * | 3/2003 | .............. B60T 10/02 |
| EP | 2300696 B1 | 12/2011 | |
| WO | WO-2015044330 A1 * | 4/2015 | .............. B60T 10/02 |
| WO | 2016209149 A1 | 12/2016 | |

* cited by examiner

HYDRODYNAMIC RETARDER

BACKGROUND OF THE INVENTION

Field of the Invention

The present invention concerns a hydrodynamic retarder with an internal working medium circuit in a working chamber of the retarder, referred to below as the working chamber working medium circuit, and an external working medium circuit in which a heat exchanger is arranged. The hydrodynamic retarder has a rotor and a stator, or a rotor and a contra-running rotor, which together form a toroidal working chamber that can be filled with the working medium in order to transmit a torque by means of the hydrodynamic working chamber working medium circuit. The retarder further has an external working medium circuit in which a heat exchanger is provided for discharging heat from the working medium. The external working medium circuit is medium-conductively connected to the working chamber via a working medium inlet and a working medium outlet, and the working medium inlet and the working medium outlet open into the working chamber at a torus outer diameter of the working chamber. A working medium feed line opens into the external working medium circuit.

A hydrodynamic retarder as concerned by the present invention may for example be positioned in a vehicle transmission and/or operated with a working medium of the transmission, in particular oil. If the working medium is supplied to the retarder via the transmission working medium, accordingly only the working medium pressure of the transmission is available for filling working chamber of the retarder.

A generic retarder is disclosed in EP 2 300 696 B1. This hydrodynamic retarder has an external working medium circuit to which working medium may be supplied via a working medium feed line in order to fill the working chamber of the retarder. The working medium feed line is for this connected to a retarder switching valve and via this may be connected optionally to a working medium pressure line (working pressure level) and a tank line, so that working medium can also be discharged from the external working medium circuit via the working medium feed line. Here, the working chamber of the retarder is filled and drained via a so-called gap filling or gap drainage by means of the external working medium circuit. For this, the external working medium circuit is connected to a working medium inlet and a working medium outlet, which each open into the working chamber at a torus outer diameter of the working chamber. Because of the circuit flow of working medium in the working chamber, a comparatively high pressure prevails at this torus outer diameter.

In order now to set a specific braking moment to be generated with the hydrodynamic retarder, working medium must be supplied to or discharged from the external working medium circuit. This supply and discharge may be controlled for example by said directional valve with the working medium pressure line connection and tank line connection. Since however the external working medium circuit opens via the working medium inlet at the torus outer diameter, a relatively high pressure is required to fill the circuit. This required pressure may be greater than the maximum pressure provided by the transmission working medium, which is established by the pressure supply of the transmission. As a result, in this case only comparatively small braking moments can be actuated with the retarder.

SUMMARY OF THE INVENTION

The present invention is therefore based on the object of improving a generic hydrodynamic retarder such that, even with low working medium pressures in the working medium pressure line, a sufficiently large braking moment can be generated with the hydrodynamic retarder.

The object according to the invention is achieved with a hydrodynamic retarder as claimed. Advantageous and particularly suitable embodiments of the invention are given in the dependent claims.

This solution according to the invention uses the different various pressure levels inside the hydraulic system in the working chamber working medium circuit and external working medium circuit to control or regulate the filling and evacuation of the working chamber or to set the optimum fill level. The accuracy in setting the desired fill level of working medium in the working chamber can be improved. At the same time, advantageously, it is possible to minimize the return flow of hot working medium, which has been heated in the working chamber, to the tank, which is usually formed by the transmission oil sump.

In detail, a hydrodynamic retarder according to the invention has a rotor and a stator, or a rotor and an contra-running rotor, wherein the rotor and stator or rotor and contra-running rotor together form a toroidal working chamber that can be filled with working medium in order to transmit a torque from the rotor to the stator, or from the rotor to the contra-running rotor, by means of a hydrodynamic working chamber working medium circuit, and hence brake the rotor. The working medium is in particular oil, for example transmission oil if the hydrodynamic retarder is connected to a vehicle transmission, supplied from its oil supply and/or integrated in this vehicle transmission.

The hydrodynamic retarder furthermore comprises an external working medium circuit in which a heat exchanger is provided for discharging heat from the working medium which has been heated in the working chamber. The external working medium circuit is medium-conductively connected to the working chamber of the retarder via a working medium inlet and a working medium outlet, wherein the working medium inlet and the working medium outlet open into the working chamber at a torus outer diameter of the working chamber. This means that the opening is positioned on the diameter of the torus wall and—viewed in an axial section through the working chamber—is not located radially further inward inside the torus cross-section. For example, the working medium inlet and/or working medium outlet open into the gap between the two impellers, which stand opposite each other in the axial direction and constitute the rotor and stator or rotor and contra-running rotor.

A working medium feed line is provided which opens into the external working medium circuit.

According to the invention, furthermore a core ring filling line is medium-conductively connected to the working chamber, wherein the core ring filling line opens into a core ring of the working chamber radially inside the torus outer diameter. In fact, a comparatively low pressure prevails in such a core ring, so that even when only a limited working medium filling pressure is available, the working chamber can be filled with working medium comparatively more easily.

The embodiment according to the invention thus advantageously allows a gap filling and gap drainage, in particular a pure gap filling and pure gap drainage of the working chamber, and in addition a core ring filling with separate gap drainage, in particular in another switch position of the directional valve, by means of which the working medium feed line is connected preferably to a working medium pressure line and in particular to a tank line.

Preferably, at a low pressure level in the core ring, a pure core ring filling takes place from a working medium pressure line, in particular of a transmission, for example the working pressure level of the transmission, wherein the core ring filling line is separated from regions with high working medium pressure in the working chamber of the retarder and in the external working medium circuit. Here, the working medium may be discharged from the working chamber via a gap drainage. Thus the maximum possible pressure difference may be used for both the supply of working medium to the working chamber and the discharge of working medium from the working chamber.

Preferably, the working medium supply line is connected by means of a directional valve to a working medium pressure line and in particular to a tank line, wherein particularly advantageously, the directional valve is configured as a pressure balance, the control piston of which is loaded on one side with the pressure of the external working medium circuit, in particular in or downstream of the working medium outlet, and on the other side, in an opposite direction, with an actuating pressure from a control pressure line, via which the desired braking moment of the hydrodynamic retarder is predefined and which in particular is proportional to the desired braking moment.

According to an embodiment of the invention, the core ring filling line branches off the working medium feed line. In this case in particular, it is favorable if a choke is provided in the working medium feed line downstream of a branch point of the core ring filling line in the flow direction of the working medium in the working medium feed line, with respect to a filling of the external working medium circuit with working medium via the working medium feed line, so as to create a predefined pressure difference in the working medium feed line.

It is furthermore favorable if a choke is provided in the core ring filling line, so as to create a predefined pressure difference in the core ring filling line.

If both chokes are provided, these may be matched to each other in flow cross-section in order to achieve the desired extent of core ring filling.

The choke(s) may be configured as constant choke(s) or adjustable choke(s).

In particular when the core ring filling line branches off the working medium supply line, the directional valve may be configured as a 3/2-way valve, for example in the form of the pressure balance described above.

According to an alternative embodiment, the core ring filling line is provided parallel to and separate from the working medium feed line. This means that the working medium flowing through the working medium feed line cannot flow into the core ring filling line. For example, the core ring filling line and the working medium feed line are connected to different ports or outlets of the directional valve. In this case in particular, the directional valve may be configured as a 4/2-way valve.

According to a preferred embodiment of the invention, the working medium can flow through the working medium feed line in two opposite directions, in order to be able not only to supply working medium via the working medium feed line to the external working medium circuit and hence to the working chamber of the retarder, but also to discharge it from the working medium circuit for drainage thereof. The supply and discharge may preferably be achieved in the same switch position of the directional valve, and apply depending on the prevailing pressure conditions, in particular depending on the actuation pressure in the control pressure line via which the retarder braking moment is predefined. Here, it is possible that a control piston of the directional valve is moved by a certain amount within the same switch position, so that the control edges set the pressure difference across the directional valve in order to achieve the desired filling and drainage. This adjustment may be achieved for example by said configuration of the directional valve as a pressure balance.

Preferably, directional valves are provided in the external working medium circuit both upstream and downstream of the heat exchanger in the flow direction of the working medium, in order to decouple the heat exchanger optionally from the external working medium circuit. For example, a directional valve is provided upstream of the heat exchanger in the flow direction, and connects the assigned port of the external working medium circuit optionally to the heat exchanger and optionally to a tank line. In particular, a directional valve may be provided downstream of the heat exchanger in the flow direction of the working medium, and connects the assigned port of the heat exchanger optionally to the port of the external medium circuit and a tank line, which at the same time may be medium-conductively connected to the directional valve in or upstream of the working medium feed line.

Also, in the case of partial fill of the working chamber with working medium when no working medium volume is present in the core ring, the working medium outlet opening at the torus outer diameter allows a working medium discharge from the working chamber, so that even particularly small braking moments may be set. At the same time, even with high rotation speeds of the retarder which are accompanied by a high working medium pressure in the working medium circuit, a complete filling may be achieved by the core ring filling.

The invention will be explained below as an example with reference to exemplary embodiments and the figures.

BRIEF DESCRIPTION OF THE SEVERAL
VIEWS OF THE DRAWING

Figure 2:
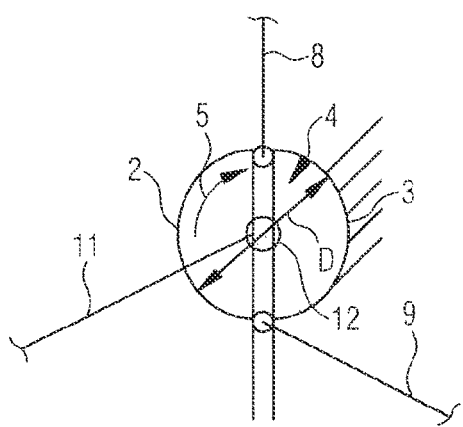
Figure 3:
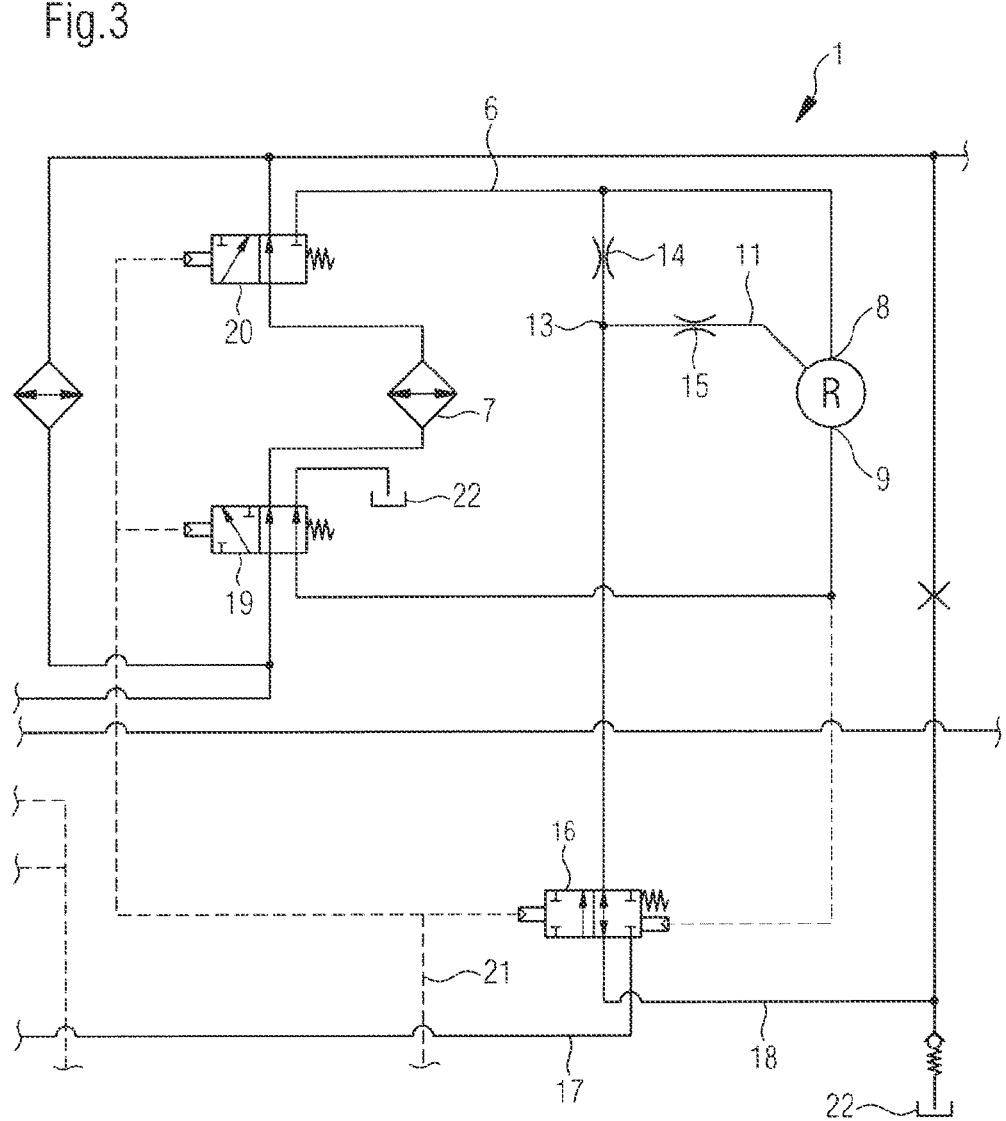

FIG. 1 a first exemplary embodiment of the invention;
FIG. 2 a schematic illustration of the working medium circuit in the working chamber of the retarder, and the connections on the working chamber for a retarder according to the invention;
FIG. 3 a further exemplary embodiment of the invention.

DETAILED DESCRIPTION OF THE
INVENTION

FIG. 1 shows schematically a hydrodynamic retarder 1 with an external working medium circuit 6. The external working medium circuit 6 is medium-conductively connected to a working chamber 4 of the retarder 1 via a working medium inlet 8 and a working medium outlet 9. Details of the connection and the working chamber 4 are depicted schematically in FIG. 2.

The working chamber 4 is formed by a vaned rotor 2 and a vaned stator 3. The rotor 2 and the stator 3 stand opposite each other in the axial direction, i.e. in the direction of the rotational axis of the rotor 2, with an axial gap. The rotational drive of the rotor 2 accelerates working medium in the working chamber 4 radially towards the outside, where it enters the stator 3, decelerates radially towards the inside there, and returns to the rotor 2 radially on the inside. Thus a hydrodynamic working chamber working medium circuit 5 is formed.

The working chamber 4 shown in cross-section is toroidal over the circumference of the rotational axis of the rotor 2, wherein the torus has a corresponding torus outer diameter D. The torus outer diameter D here refers to the diameter of the full circle from which the torus is formed in the mathematical sense by rotation about the rotational axis. At least approximately in the middle of the torus outer diameter D or working chamber 4 lies the so-called core ring 12 of the working chamber 4, which is determined accordingly by the eye of the working chamber working medium circuit 5. Both the working medium inlet 8 and the working medium outlet 9 open into the working chamber 4 at the torus outer diameter D of the working chamber 4.

In addition, the core ring filling line 11 opens into the working chamber 4. This core ring filling line 11 opens into the core ring 12, i.e. at a site in the working chamber 4 with comparatively low working medium pressure, in particular the lowest working medium pressure, whereas in particular the working medium outlet 9 opens into the working chamber 4 at a site of high pressure. For this, the opening of the working medium outlet 9 may for example also be provided radially further outward in the working chamber 4 with respect to the rotational axis of the rotor 2. In particular, the positions shown here of the working medium inlet 8 and working medium outlet 9 may be interchanged. Furthermore, it is not absolutely necessary for the working medium inlet 8 and/or the working medium outlet 9 to open into the gap shown between the rotor 2 and stator 3.

FIG. 1 shows that the core ring filling line 11 is provided in addition to a working medium feed line 10, which is connected to the external working medium circuit 6 in particular outside a retarder housing. The working medium feed line 10 and the core ring filling line 11 are however connected to ports of a common directional valve 16 which is configured as a pressure balance. The directional valve 16 has two switch positions, and in addition to said ports of the working medium feed line 10 and core ring filling line 11, has a port for a working medium pressure line 17 and a port for a tank line 18. The directional valve 16 is thus configured as a 4/2-way valve.

Of the pressure ports of the directional valve 16 which are positioned and act opposite each other, one is connected to the external working medium circuit 6 downstream of the working medium outlet 9, and the other is connected to a control pressure line 21, via whose pressure the desired braking moment of the hydrodynamic retarder 1 is set. The control pressure line 21 furthermore loads a directional valve 19 which is situated upstream of a heat exchanger 7 in the flow direction of the working medium in the external working medium circuit 6, and a directional valve 20 which is situated downstream of the heat exchanger 7 in the flow direction of the working medium in the external working medium circuit 6. Thus it is possible to switch the heat exchanger 7 optionally into and out of the external working medium circuit 6, so that the heat exchanger 7 may be used to cool the working medium from the retarder 1 or for other cooling purposes. FIG. 1 here shows the disconnected state of the heat exchanger 7, in which the external working medium circuit 6 is connected to the tank 22 on the output side of the directional valve 19, and the directional valve 20 connects the heat exchanger 7 to the tank line 18.

As indicated by the double arrow, the working medium can flow through the working medium feed line 10 in both directions, either to supply working medium to the external working medium circuit 6 or to discharge it from this.

In the embodiment shown in FIG. 3, the connection of the core ring filling line 11 is different from the exemplary embodiment in FIG. 1. Otherwise, reference is made to the illustration in FIGS. 1 and 2, wherein the same reference signs are used for corresponding components.

In the exemplary embodiment shown in FIG. 3, the core ring filling line 11 branches off the working medium feed line 10. To create the suitable pressure conditions, chokes 14 and 15 are provided, with choke 14 in the working medium feed line 10 downstream of the branch point of the core ring filling line 11, and choke 15 in the core ring filling line 11.

The directional valve 16 may thus be configured as a 3/2-way valve, accordingly with only three ports, since the separate connection of the working medium pressure line 17 to the core ring filling line 11 (as shown in FIG. 1) may be omitted.

The branch point of the core ring filling line 11 from the working medium feed line 10 is marked 13.

LIST OF REFERENCE SIGNS

1 Retarder
2 Rotor
3 Stator
4 Working chamber
5 Working chamber working medium circuit
6 External working medium circuit
7 Heat exchanger
8 Working medium inlet
9 Working medium outlet
10 Working medium feed line
11 Core ring filling line
12 Core ring
13 Branch point
14 Choke
15 Choke
16 Directional valve
17 Working medium pressure line
18 Tank line
19 Directional valve
20 Directional valve
21 Control pressure line
22 Tank
D Torus outer diameter

The invention claimed is:

1. A hydrodynamic retarder, comprising:
a rotor and a stator, or a rotor and a counter-running rotor, together forming a toroidal working chamber to be filled with working medium in order to transmit a torque by a hydrodynamic working chamber working medium circuit;
an external working medium circuit with a heat exchanger for removing heat from the working medium, said external working medium circuit being medium-conductively connected to said working chamber via a working medium inlet and a working medium outlet;
said working medium inlet and said working medium outlet opening into said working chamber at a torus outer diameter of said working chamber;
a working medium feed line opening into said external working medium circuit;
a core ring filling line medium-conductively connected to said working chamber and opening into a core ring of said working chamber radially inside the torus outer diameter; and
a directional valve for selectively connecting said working medium feed line to a working medium pressure line and to a tank line.

2. The hydrodynamic retarder according to claim 1, wherein said core ring filling line branches off from said working medium feed line.

3. The hydrodynamic retarder according to claim 2, further comprising a choke connected in said working medium feed line downstream of a branch point of said core ring filling line in a flow direction of the working medium via said working medium feed line into said working medium chamber, so as to generate a predefined pressure difference.

4. The hydrodynamic retarder according to claim 2, further comprising a choke connected in said core ring filling line so as to generate a predefined pressure difference.

5. The hydrodynamic retarder according to claim 1, wherein said directional valve is 3/2-way valve.

6. The hydrodynamic retarder according to claim 1, further comprising at least one directional valve in said external working medium circuit respectively upstream and downstream of said heat exchanger in the flow direction of the working medium, in order to decouple said heat exchanger from said external working medium circuit.

7. A hydrodynamic retarder, comprising:
- a rotor and a stator, or a rotor and a counter-running rotor, together forming a toroidal working chamber to be filled with working medium in order to transmit a torque by a hydrodynamic working chamber working medium circuit;
- an external working medium circuit with a heat exchanger for removing heat from the working medium, said external working medium circuit being medium-conductively connected to said working chamber via a working medium inlet and a working medium outlet;
- said working medium inlet and said working medium outlet opening into said working chamber at a torus outer diameter of said working chamber;
- a working medium feed line opening into said external working medium circuit; and
- a core ring filling line medium-conductively connected to said working chamber and opening into a core ring of said working chamber radially inside the torus outer diameter;
- said working medium feed line being connected to a tank line by way of a directional valve; and
- said core ring filling line and said working medium feed line being connected to different outlets of said directional valve.

8. The hydrodynamic retarder according to claim 7, wherein said directional valve is a 4/2-way valve.

9. A hydrodynamic retarder, comprising:
- a rotor and a stator, or a rotor and a counter-running rotor, together forming a toroidal working chamber to be filled with working medium in order to transmit a torque by a hydrodynamic working chamber working medium circuit;
- an external working medium circuit with a heat exchanger for removing heat from the working medium, said external working medium circuit being medium-conductively connected to said working chamber via a working medium inlet and a working medium outlet;
- said working medium inlet and said working medium outlet opening into said working chamber at a torus outer diameter of said working chamber;
- a working medium feed line opening into said external working medium circuit; and
- a core ring filling line medium-conductively connected to said working chamber and opening into a core ring of said working chamber radially inside the torus outer diameter;
- wherein said working medium feed line is connected to a working medium pressure line by way of a directional valve, and said working medium feed line is configured to conduct the working medium in two opposite directions, in order optionally to conduct working medium into, and discharge the working medium from, the external working medium circuit.

* * * * *